United States Patent [19]

Tao

[11] 3,887,572
[45] June 3, 1975

[54] PREPARATION OF 2-AMINO-5-ALKYL-1,3,4-THIADIAZOLES

[75] Inventor: Eddie Vi Ping Tao, Indianapolis, Ind.

[73] Assignee: Eli Lilly and Company, Indianapolis, Ind.

[22] Filed: Sept. 21, 1973

[21] Appl. No.: 399,679

[52] U.S. Cl............................................ 260/306.8 D
[51] Int. Cl............................................. C07d 91/62
[58] Field of Search............................ 260/306.8 D

[56] References Cited
UNITED STATES PATENTS 2,799,683   7/1957   Song.......................... 260/306.8 D
2,943,980   7/1960   Maffii......................... 260/306.8 D

OTHER PUBLICATIONS

Haggarth, J. Chem. Soc., 1163 (1949).
Ohta et al., J. Pharm. Soc. Japan, 72, 376 (1952).

*Primary Examiner*—Richard J. Gallagher
*Attorney, Agent, or Firm*—William B. Scanlon; Everet F. Smith

[57] ABSTRACT

This invention relates to an improved process for preparing 2-amino-5-alkyl-1,3,4-thiadiazole compounds by reacting an aliphatic acid and a thiosemicarbazide in a mineral acid medium comprising 15 to 35 percent sulfuric acid and 65 to 85 percent polyphosphoric acid by weight.

8 Claims, No Drawings

PREPARATION OF 2-AMINO-5-ALKYL-1,3,4-THIADIAZOLES

BACKGROUND OF THE INVENTION

2-Amino-5-alkyl-1,3,4-thiadiazole compounds are conventionally prepared by acylating a 4-alkylthiosemicarbazide and cyclodehydrating the resulting product. The cyclodehydration is customarily carried out in the presence of concentrated sulfuric acid or polyphosphoric acid [see M. Ohta and T. Higashijimia, *J. Pharm. Soc. Japan*, 72, 376 (1952), E. Haggarth, *J. Chem. Soc.*, 1163 (1949) and U.S. Pat. No. 2,799,683]. Other well documented methods of cyclodehydration involve the use of polyphosphoric acid, phosphorous pentachloride, or acid chlorides as catalytic agents.

It is a purpose of this invention to employ a mixed mineral acid medium for cyclodehydration to provide improved yields of 2-amino-5-alkyl-1,3,4-thiadiazole compounds.

The compounds provided by this invention are reacted with alkylisocyanates to prepare 1-(5-alkyl-1,3,4-thiadiazol-2-yl)-1,3-dialkyl ureas which are useful as herbicides [see German published application No. 1816696].

SUMMARY OF THE INVENTION

This invention concerns an improved process for preparing a compound of the formula

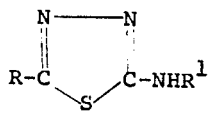

wherein R is $C_1$–$C_7$ alkyl and $R^1$ is hydrogen or $C_1$–$C_6$ alkyl, by reacting molar equivalents of an aliphatic acid and a 4-alkyl-3-thiosemicarbazide in mineral acid, which improvement comprises employing an acid mixture comprising 65 to 85 percent polyphosphoric acid and 15 to 35 percent sulfuric acid by weight.

DETAILED DESCRIPTION

This invention concerns an improved process for preparing a 2-amino-5-alkyl-1,3,4-thiadiazole compound represented by the formula

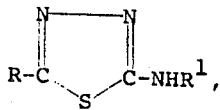

wherein R is $C_1$–$C_7$ alkyl and R' is hydrogen or $C_1$–$C_6$ alkyl, by reacting molar equivalents of an aliphatic acid represented by the formula, RCOOH, and a 4-alkyl-3-thiosemicarbazide represented by the formula,

to provide in situ an intermediate acylthiosemicarbazide, and cyclodehydrating the intermediate in mineral acid, which improvement comprises employing a mixed mineral acid medium comprising 65 to 85 percent polyphosphoric acid and 15 to 35 percent sulfuric acid by weight for acylation and cyclodehydration.

The term "$C_1$–$C_7$ alkyl" includes methyl, ethyl, n-propyl, isopropyl, t-butyl, n-butyl, isobutyl, sec-butyl, 1-pentyl, 2-pentyl, 3-pentyl, 3-methyl-1-butyl, 3-methyl-2-butyl, 2-methyl-2-butyl, neopentyl, 1-hexyl, 2-hexyl, 3-hexyl, 1-heptyl, 2-heptyl, 3-heptyl, 4-heptyl, 4-methyl-1-pentyl, 4-methyl-2-pentyl, 2-methyl-2-pentyl, 2-methyl-3-pentyl, 2,3-dimethyl-1-butyl, 2,3-dimethyl-2-butyl, 3,3-dimethyl-1-butyl, 3,3-dimethyl-2-butyl, 2,2-dimethyl-1-butyl, 2-ethyl-1-butyl, 2-ethyl-2-butyl, and the like.

Illustrative groups for $R^1$ when it represents "$C_1$–$C_6$ alkyl" are included in the above listing.

The starting materials required for the process are either commercially available or are prepared by methods known to the art. Representative of aliphatic acids which can be employed in the process are acetic acid, propionic acid, butyric acid, isobutyric acid, pivalic acid, valeric acid, hexanoic acid, heptanoic acid, and the like.

The required thiosemicarbazides represented by the formula

wherein $R^1$ is hydrogen or $C_1$–$C_6$ alkyl, are commercially available or are prepared by reacting an isothiocyanate of the formula, $R^1$—N=C=S, with hydrazine. Representative of such thiosemicarbazides are thiosemicarbazide, 4-methyl-3-thiosemicarbazide, 4-ethyl-3-thiosemicarbazide, 4-propyl-3-thiosemicarbazide, 4-isopropyl-3-thiosemicarbazide, 4-butyl-3-thiosemicarbaizde, 4-t-butyl-3-thiosemicarbazide, 4-pentyl-3-thiosemicarbazide, 4-neopentyl-3-thiosemicarbazide, 4-hexyl-3-thiosemicarbazide, and the like.

The use of sulfuric acid or polyphosphoric acid alone for cyclodehydrating 1-acyl-4-alkylthiosemicarbazides to produce 2-amino-5-alkyl-1,3,4-thiadiazole compounds is known in the art [see U.S. Pat. No. 2,799,683]. The present invention employs a mixed mineral acid medium comprising 15 to 35 percent sulfuric acid and 65 to 85 percent polyphosphoric acid (PPA) by weight for cyclodehydration to provide improved yields of 2-amino-5-alkyl-1,3,4-thiadiazole compounds which are not achieved by the use of either acid alone.

For example, when 2-t-butyl-5-methylamino-1,3,4-thiadiazole is prepared from pivalic acid and 4-methyl-3-thiosemicarbazide in sulfuric acid at a cyclodehydration temperature of 105°C., the yield is about 70 percent. When PPA is employed for cyclodehydration under similar conditions, the yield of the product is about 80 percent. The yield of 2-t-butyl-5-methylamino-1,3,4-thiadiazole is at least 90 percent when the sulfuric acid-polyphosphoric acid mixture is employed.

The preferred range of the acid mixture is 20 to 33 percent sulfuric acid and 67 to 80 percent polyphosphoric acid. Particularly preferred is the acid mixture comprising 25 percent sulfuric acid and 75 percent PPA with which maximum yields are obtained. Wider ratios of acids are suitable but are less economical. As the PPA content is increased beyond 80 percent, the yields begin to decrease although they are still significantly higher than those obtained with PPA or sulfuric acid alone.

The acids employed are commercial acids and the PPA is the ordinary polyphosphoric acid which contains from 82 to 86 percent of $P_2O_5$. The acids are intimately mixed before the addition of the reactants. Polyphosphoric acid is very viscous and the acids tend to layer when poured together. Such layering, if not corrected, will result in decomposition of the reactants or lower yields of less pure product. The amount of acid mixture is not critical; however, sufficient mixed acid medium is used to obtain a stirrable mixture at the cyclodehydration temperature.

Preferably, the thiosemicarbazide reactant is added first to the cold acid mixture and a molar equivalent of the appropriate aliphatic acid is added thereto. When portionwise addition is employed, molar equivalent aliquots of the reactants are added in the preferred manner.

Initially, the temperature of the acid mixture is maintained between about 10°C. and 20°C. during the addition of the reactants to avoid decomposition of the thiosemicarbazide. In the cold, prior to cyclodehydration, the aliphatic acid and the thiosemicarbazide react to produce an acylthiosemicarbazide in situ, which undergoes cyclodehydration at elevated temperatures to provide the thiadiazole moiety. The cyclodehydration is completed by heating the reaction mixture at temperatures between about 100°C. and 120°C. The preferred cyclodehydration temperature is about 105° to 110°C. at which thiadiazole formation occurs in about 3 hours. The heating period varies inversely with the temperature. Temperatures below about 100°C. usually require an uneconomically long reaction period even though the reaction proceeds at these lower temperatures.

After cyclodehydration is completed, preferably at 105°C., the reaction mixture is diluted with water, the temperature is lowered and the acid is neutralized to provide the aminothiadiazole free base. Any alkali metal hydroxide such as sodium or potassium hydroxide is suitable for providing a pH of 6.8–7.3 at which the free base precipitates. Ammonium hydroxide is also conveniently used.

The insoluble aminothiadiazole product is usually recovered by conventional filtration methods. However, the product may also be extracted into an organic phase, preferably an aromatic hydrocarbon solvent, for convenience in performing further chemical operations. For example, after cyclodehydration is completed, water and, preferably, toluene are added to the reaction mixture. The mixture is neutralized and the aminothiadiazole free base is extracted into the toluene layer. The layers are separated and the toluene solution containing the product is dried azeotropically. The appropriate isocyanate is added thereto and the mixture is heated from 1 to 2 hours at a temperature of about 85°C. to 90°C. to provide a 1-(5-alkylthiadiazolyl)-1,3-dialkylurea, useful as a herbicide. The term aromatic hydrocarbon solvent as used herein means benzene and its alkylated derivatives, such as toluene, o-chlorotoluene and ethyl benzene as well as the various xylenes, o-, m- and p-xylene.

In carrying out the instant process, a preferred mixture comprising 25 percent sulfuric acid and 75 percent polyphosphoric acid (PPA) is cooled to about 10°C. The appropriate thiosemicarbazide is added to the cold acid mixture, following which a molar equivalent of the required aliphatic acid is added while the acid mixture temperature is maintained between about 10°C. and about 20°C. After the reactants are added, the temperature rises and the reaction mixture is maintained at about 105°C. for about 3 hours to complete the cyclodehydration. Water and a hydrocarbon solvent are added, and the reaction mixture is neutralized with 28 percent ammonium hydroxide, the final pH being in the range of 6.8 to 7.3. The layers are separated and the solution containing the 2-alkylamino-5-alkyl-1,3,4-thiadiazole free base is dried azeotropically.

Illustrative of the 2-amino-5-alkyl-1,3,4-thiadiazole compounds provided by this invention are the following:
  2-amino-5-isopropyl-1,3,4-thiadiazole
  2-methylamino-5-isopropyl-1,3,4-thiadiazole
  2-amino-5-s-butyl-1,3,4-thiadiazole
  5-s-butyl-2-methylamino-1,3,4-thiadiazole
  2-amino-5-t-butyl-1,3,4-thiadiazole
  5-t-butyl-2-methylamino-1,3,4-thiadiazole
  2-amino-5-t-pentyl-1,3,4-thiadiazole
  2-methylamino-5-t-pentyl-1,3,4-thiadiazole
  2-amino-5-(1-ethylpropyl)-1,3,4-thiadiazole
  5-(1-ethylpropyl)-2-methylamino-1,3,4-thiadiazole
  2-amino-5-(1-methylbutyl)-1,3,4-thiadiazole
  2-methylamino-5-(1-methylbutyl)-1,3,4-thiadiazole
  2-amino-5-(1-methylpentyl)-1,3,4-thiadiazole
  2-methylamino-5-(1-methylpentyl)-1,3,4-thiadiazole
  2-amino-5-(1,1-dimethylbutyl)-1,3,4-thiadiazole
  2-methylamino-5-(1,1-dimethylbutyl)-1,3,4-thiadiazole
  2-amino-5-(1-ethylbutyl)-1,3,4-thiadiazole
  5-(1-ethylbutyl)-2-methylamino-1,3,4-thiadiazole
  2-amino-5-(1-methylhexyl)-1,3,4-thiadiazole
  2-methylamino-5-(1-methylhexyl)-1,3,4-thiadiazole
  2-amino-5-(1,1-dimethylpentyl)-1,3,4-thiadiazole
  2-methylamino-5-(1,1-dimethylpentyl)-1,3,4-thiadiazole
  2-amino-5-(1-ethylpentyl)-1,3,4-thiadiazole
  5-(1-ethylpentyl)-2-methylamino-1,3,4-thiadiazole
  2-ethylamino-5-isopropyl-1,3,4-thiadiazole
  5-s-butyl-2-propylamino-1,3,4-thiadiazole
  5-t-butyl-2-butylamino-1,3,4-thiadiazole
  2-pentylamino-5-isopropyl-1,3,4-thiadiazole
  2-hexylamino-5-s-butyl-1,3,4-thiadiazole
  2-amino-5-methyl-1,3,4-thiadiazole
  2-methylamino-5-methyl-1,3,4-thiadiazole

EXAMPLE 1

Preparation of 2-ethyl-5-methylamino-1,3,4-thiadiazole

A mineral acid mixture was prepared by intimately mixing 18 g. of $H_2SO_4$ and 54 g. of PPA. The acid mixture was kept at a temperature between 10° and 15°C. while 21 g. (0.2 mole) of 4-methyl-3-thiosemicarbazide was added following which 14.8 g. (0.2 mole) of propionic acid was added. The temperature was allowed to rise exothermically and the acid mixture was maintained at a temperature between 100° and 105°C. for 3 hours. Water (50 ml.) and toluene (50 ml.) were added. The reaction mixture was adjusted to about pH 7.0 by the addition of 110 ml. of 28 percent ammonium hydroxide. The toluene layer containing the 2-methylamino-5-ethyl-1,3,4-thiadiazole was separated and dried by azeotropic distillation to provide 26.7 grams (93 percent yield) of 2-ethyl-5-methylamino- 1,3,4-thiadiazole, m.p. 84°–87°C., after evaporation of the toluene in vacuo.

EXAMPLE 2

Preparation of 2-isopropyl-5-methylamino-1,3,4-thiadiazole

Following the method of Example 1, 21 g. (0.2 mole) of 4-methyl-3-thiosemicarbazide and 17.6 g. (0.2 mole) of isobutyric acid were reacted in 72 g. of mixed acid medium to provide 26.7 grams (85 percent yield) of 2-isopropyl-5-methylamino-1,3,4-thiadiazole as an oil.

EXAMPLE 3

Preparation of 2-t-butyl-5-methylamino-1,3,4-thiadiazole

A mixture of polyphosphoric acid 270 g., and sulfuric acid, 90 g., was cooled to 10°C. The temperature was maintained between 10°C. and 20°C. by cooling while 1 mole, 105 g., of 4-methyl-3-thiosemicarbazide was added, following which one mole, 102 g., of pivalic acid was added. Cooling was discontinued after the addition was completed and the temperature rose to 110°C. from the exothermic reaction. The reaction mixture was kept at about 105°C. for about 3 hours to complete the cyclodehydration. Two hundred and fifty milliliters of water and 250 ml. of toluene were added. The reaction mixture was neutralized to pH 7.0 (75°C.) with 525 ml. of ammonium hydroxide. The warm layers were separated and the toluene solution was dried by azeotropic distillation. The toluene was evaporated in vacuo to provide 159 grams (93 percent yield) of 2-t-butyl-5-methylamino-1,3,4-thiadiazole, m.p. 79°–82°C.

I claim:

1. In a process for preparing an aminothiadiazole compound of the formula

wherein R is $C_1$–$C_7$ alkyl and $R^1$ is hydrogen or $C_1$–$C_6$ alkyl, by reacting molar equivalents of an aliphatic acid and a 4-alkyl-3-thiosemicarbazide in a mineral acid medium, the improvement which comprises employing a mineral acid medium comprising 15 to 35 percent sulfuric acid and 65 to 85 percent polyphosphoric acid.

2. The process of claim 1 wherein the aminothiadiazole preparation is completed by heating at a temperature between 100°C. and 120°C.

3. The process of claim 2 wherein the mineral acid medium comprises 20 to 33 percent sulfuric acid and 67 to 80 percent polyphosphoric acid.

4. The process of claim 2 wherein the mineral acid medium comprises 25 percent sulfuric acid and 75 percent polyphosphoric acid.

5. The process of claim 4 wherein 2-amino-5-t-butyl-1,3,4-thiadiazole is prepared from pivalic acid and thiosemicarbazide.

6. The process of claim 4 wherein 5-t-butyl-2-methylamino-1,3,4-thiadiazole is prepared from pivalic acid and 4-methyl-3-thiosemicarbazide.

7. The process of claim 4 wherein 2-amino-5-isopropyl-1,3,4-thiadiazole is prepared from isobutric acid and thiosemicarbazide.

8. The process of claim 4 wherein 2-methylamino-5-isopropyl-1,3,4-thiadiazole is prepared from isobutyric acid and 4-methyl-3-thiosemicarbazide.

* * * * *